US012476564B2

(12) United States Patent
Ji et al.

(10) Patent No.: US 12,476,564 B2
(45) Date of Patent: Nov. 18, 2025

(54) LOW-VIBRATION FAULT-TOLERANT CURRENT ALGORITHM FOR OPEN-PHASE FAULTS OF SIX-PHASE PERMANENT MAGNET MOTORS

(71) Applicant: JIANGSU UNIVERSITY, Zhenjiang (CN)

(72) Inventors: Jinghua Ji, Zhenjiang (CN); Yunhan Zhou, Zhenjiang (CN); Wenxiang Zhao, Zhenjiang (CN); Tao Tao, Zhenjiang (CN); Shengdao Zhu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/271,239

(22) PCT Filed: Nov. 10, 2022

(86) PCT No.: PCT/CN2022/131129
§ 371 (c)(1),
(2) Date: Aug. 2, 2024

(87) PCT Pub. No.: WO2024/087255
PCT Pub. Date: May 2, 2024

(65) Prior Publication Data
US 2025/0323590 A1    Oct. 16, 2025

(30) Foreign Application Priority Data
Oct. 24, 2022    (CN) .......................... 202211301717.0

(51) Int. Cl.
*H02P 21/05*    (2006.01)
*H02P 21/14*    (2016.01)
*H02P 25/22*    (2006.01)

(52) U.S. Cl.
CPC .............. *H02P 21/05* (2013.01); *H02P 21/14* (2013.01); *H02P 25/22* (2013.01)

(58) Field of Classification Search
CPC ........... H02P 21/05; H02P 21/14; H02P 25/22
(Continued)

(56) References Cited

U.S. PATENT DOCUMENTS 8,639,130 B2 *    1/2014    Miura ................ G03G 15/0862
250/576
2022/0329188 A1    10/2022    Arafat et al.

FOREIGN PATENT DOCUMENTS

| CN | 107171601 A | 9/2017 |
|---|---|---|
| CN | 110912468 A | 3/2020 |

(Continued)

OTHER PUBLICATIONS

Liu Jian, et al., Research on the Method of Reducing Torque Ripple for Six-phase Permanent Magnet Synchronous Motor (PMSM) Based on Fundamental Current Regulation, Micromotors, 2020, pp. 49-54, vol. 53 No. 7.

(Continued)

*Primary Examiner* — David Luo
(74) *Attorney, Agent, or Firm* — Bayramoglu Law Offices LLC

(57) ABSTRACT

A low-vibration fault-tolerant current algorithm for six-phase permanent magnet motors under open-phase faults is provided. When a six-phase permanent magnet motor is supplied through a full-bridge configuration, the vibration performance of the motor dramatically deteriorates if the open-phase fault occurs. The types of open-phase faults include one-phase open-phase, adjacent two-phase open-phase, non-adjacent two-phase open-phase, and at most three-phase open-phase faults. To suppress the deterioration of the vibration response when open-phase fault occurs, the (Continued)

remaining phase magnetomotive force is reconfigured based on the reverse magnetomotive force in the synthesized magnetomotive force from the residual phases under different open-phase fault types, and the remaining phase currents are adjusted to maintain normal vibration response.

10 Claims, 6 Drawing Sheets

(58) Field of Classification Search
USPC .............................. 318/400.02, 400.01, 700
See application file for complete search history.

(56) References Cited

FOREIGN PATENT DOCUMENTS

| CN | 113364364 A | 9/2021 |
|---|---|---|
| CN | 114026444 A | 2/2022 |

OTHER PUBLICATIONS

Tong Chengde, et al., Simulation of DTP-PMSM Drive and Fault-tolerant Control System Based on Six-phase Eight-leg VSI, Journal of Power Supply, 2016, pp. 15-23, vol. 14 No. 5.

Guohai Liu, et al., Third Harmonic Current Injection in Fault-Tolerant Five-Phase Permanent-Magnet Motor Drive, IEEE Transactions on Power Electronics, 2018, pp. 6970-6979, vol. 33 No. 8.

\* cited by examiner

LOW-VIBRATION FAULT-TOLERANT CURRENT ALGORITHM FOR OPEN-PHASE FAULTS OF SIX-PHASE PERMANENT MAGNET MOTORS

CROSS REFERENCE TO THE RELATED APPLICATIONS

This application is the national phase entry of International Application No. PCT/CN2022/131129, filed on Nov. 10, 2022, which is based upon and claims priority to Chinese Patent Application No. 202211301717.0, filed on Oct. 24, 2022, the entire contents of which are incorporated herein by reference.

TECHNICAL FIELD

The present disclosure relates to a low-vibration fault-tolerant current algorithm for open-phase faults of six-phase permanent magnet motors. It belongs to the field of low-vibration and high-reliability driving technology for multi-phase permanent magnet motors in aviation, electric vehicles, ships, and other areas.

BACKGROUND

Compared to traditional three-phase permanent magnet motors, six-phase permanent magnet motors have significant advantages in driving degree of freedom. Adopting a multi-phase driving scheme can not only improve the output torque performance but also reconfigure the remaining phase magnetomotive force by adjusting the fault-tolerant current algorithm when the motor experiences open-phase faults, thereby maintaining the torque output capability. Therefore, multi-phase permanent magnet motors are increasingly widely used in high-reliability, low-vibration applications such as aviation, electric vehicles, ships, and other fields. However, the current fault-tolerant current algorithm only focuses on how to improve the torque quality under fault operation or maintain the stability of the thermal rise under open-phase fault operation. These fault-tolerant control methods do not consider the vibration performance of the motor. Worsened vibration performance can damage the bearing life and even destabilize the motor system. Therefore, while ensuring fault-tolerant operation of the motor under open-phase faults, designing a low-vibration fault-tolerant current algorithm has become an urgent problem that needs to be solved.

The paper "Third harmonic current injection in fault-tolerant five-phase permanent-magnet motor drive [J]. IEEE Transactions on Power Electronics, Vol. 33, No. 8, pp. 6970-6979, August 2018" proposed a method of injecting third harmonic currents into the remaining phase windings under the open-phase faults to improve torque pulsation. However, this method introduces new current harmonics, which inevitably introduces new winding magnetomotive force harmonics and deteriorates the vibration performance under the fault-tolerant operation. Therefore, it cannot achieve the joint optimization of torque and vibration performance.

Chinese invention patent publication number CN113364364A discloses a fault-tolerant control method for open-phase faults of six-phase permanent magnet motors with adjustable torque fluctuations. The invention solves the problems of torque reduction and torque fluctuations under open-phase faults of six-phase permanent magnet motors, which need to balance compensation for different power demands. However, in the fault-tolerant current waveform, the reconfiguration of fault-tolerant phase current has poor symmetry, and the amplitude of the current is inconsistent, which cannot achieve the complete cancellation of the fundamental reverse magnetomotive force and cannot maximize the suppression of zero-order vibrations and improve the vibration performance under the fault-tolerant operation.

SUMMARY

The purpose of the present disclosure is to improve the shortcomings of the existing fault-tolerant control technology for six-phase permanent magnet motors. A low-vibration fault-tolerant current algorithm for open-phase faults of six-phase permanent magnet motors is proposed, which has strong standardization and is applicable to six-phase permanent magnet motors with different slot-pole combinations. When the motor operates under the open-phase fault conditions and adopts this fault-tolerant current algorithm, the vibration performance of the motor is significantly improved. In addition, this structure can further optimize torque pulsation and electromagnetic performance under the open-phase faults, balancing the suppression of vibration and improvement of torque performance, greatly enhancing the smoothness of the motor operation under open-phase fault conditions.

The present disclosure is implemented using the following technical solution: A low-vibration fault-tolerant current algorithm for open-phase faults of six-phase permanent magnet motors. The specific steps are as follows:

Step 1: Establishing an electromagnetic simulation model of the motor to simulate the torque, magnetomotive force distribution, and radial force distribution under the healthy operation, and detecting the vibration response of the motor.

Step 2: Dividing the different types of open-phase faults for six-phase permanent magnet motors, simulating the torque, magnetomotive force distribution and radial force distribution under different open-phase faults, and verifying the vibration response when the motor operates under different open-phase faults.

Step 3: Based on the differences in magnetomotive force distribution under different open-phase faults, designing the reconfigured synthetic magnetomotive force of the remaining phase windings for each open-phase fault type.

Step 4: Based on the reconfiguration scheme of the synthetic magnetomotive force of the remaining phase windings, determining the phase angle of the remaining phase current and solving the expression of the low-vibration fault-tolerant current.

Step 5: Substituting the calculated expression of the low-vibration fault-tolerant current and simulating the radial force distribution under the fault-tolerant operation to verify the improvement of the vibration response under the fault-tolerant operation.

The present disclosure has the following advantages.

1. The application object of the present disclosure is a six-phase permanent magnet motor, which has unique advantages such as high efficiency, high power density, and low vibration. In recent years, it has been widely used in applications such as aviation, electric vehicles, and ships. At the same time, the use of multi-phase winding structure improves the driving control freedom and enhances the reliability of the motor.

2. The driving method of the present disclosure motor adopts the full-bridge driving structure, which realizes electrical isolation between the control of each phase winding, ensuring that the phase angle of the remaining phase winding current is not affected after one or several phases experience open-phase fault. This is very beneficial for fault-tolerant control of multi-phase permanent magnet motors.

3. The present disclosure designs a fault-tolerant current algorithm for multiple types of open-phase faults, which is applicable to multiple types of open-phase faults. Specifically, it includes one-phase, adjacent two-phase, non-adjacent two-phase, and three-phase open-phase fault.
4. The fault-tolerant current driving method designed for the open-phase fault in the present disclosure achieves optimal fault-tolerant vibration performance, ensuring the stable operation of the motor under the open-phase fault.
5. The fault-tolerant current driving method designed for the open-phase fault in the present disclosure has a significant improvement effect on torque pulsation compared with the torque pulsation under open-phase fault operation.
6. Under the low-vibration fault-tolerant current driving operation, the average output torque under the corresponding open-phase fault and fault-tolerant operation are consistent, realizing stable output torque capability of the motor.

In summary, the proposed low-vibration fault-tolerant current algorithm for open-phase faults of six-phase permanent magnet motors can be applied to multiple types of open-phase faults, improving the vibration performance and the torque pulsation of the motor under fault-tolerant operation. It ensures the output torque capability and overcomes the limitation of the single application effect of conventional open-phase fault-tolerant current algorithm of six-phase permanent magnet motors.

In the figures: 1—stator windings, 2—stator core, 3—rotor core, 4—rotor permanent magnet.

DETAILED DESCRIPTION OF THE EMBODIMENTS

To make the purpose, technical solution, and advantages of the present disclosure clearer and more understandable, the following detailed description and embodiment will be made in conjunction with the accompanying drawings. It should be understood that the specific embodiments described herein are for the purpose of explaining the present disclosure and are not intended to limit the scope of the invention. To illustrate the advantages of the present disclosure more clearly and concisely, a specific six-phase permanent magnet motor will be described in detail below.

Figure 1:
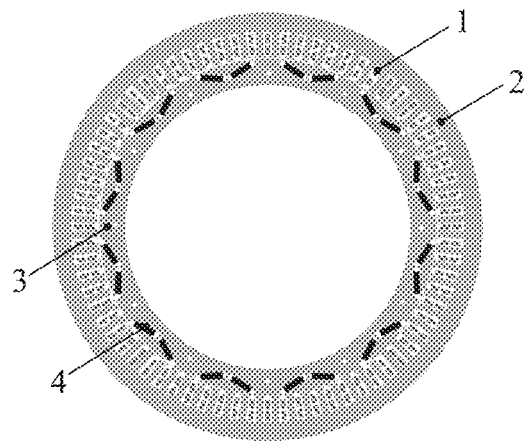
FIG. 1 shows the structure of the electromagnetic effective part of the six-phase permanent magnet motor in the present disclosure.

The meanings of the structures in FIG. 1 are as follows: 1. stator winding, 2. stator core, 3. rotor core, 4. rotor permanent magnet. In this embodiment, the permanent magnet motor adopts a slot-pole combination of 72-slots/12-pole. The stator winding 1 is embedded in the stator core 2 by a distributed winding structure, while the permanent magnet 4 is embedded in the rotor core 3. When the motor operates under the load condition, six-phase sinusoidal current waveforms are injected to the stator winding 1, and the motor is driven by a full-bridge driving mode.

Figure 2:
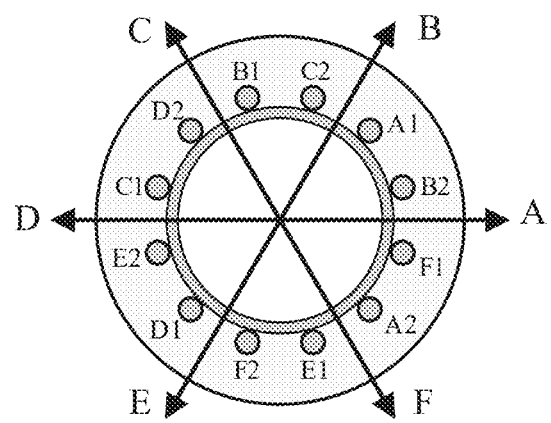
FIG. 2 shows the spatial phase vector distribution of the six-phase permanent magnet motor in the present disclosure.
Figure 3:
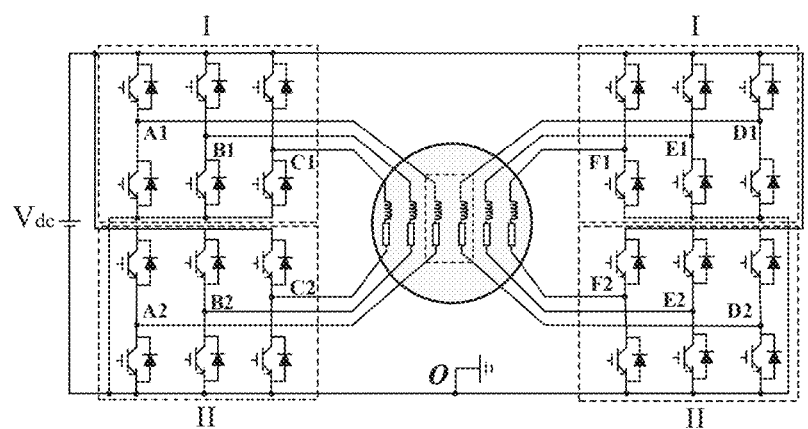
FIG. 3 shows the external driving circuit structure of the six-phase permanent magnet motor in the present disclosure.
Figure 4:
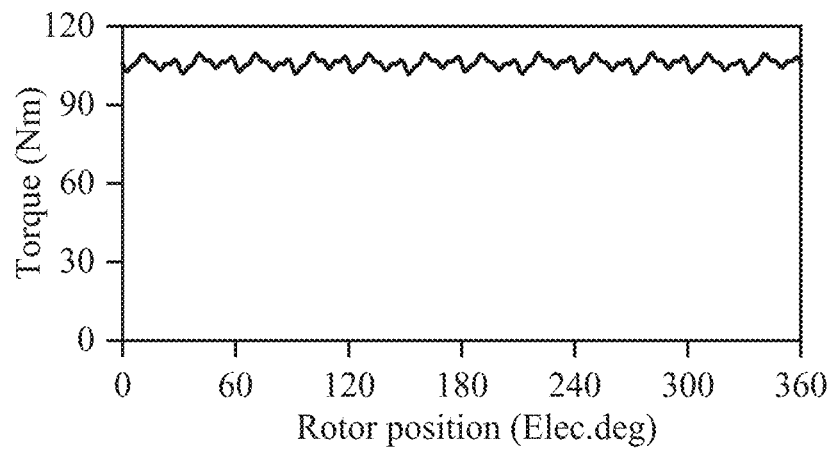
FIG. 4 shows the rated torque waveform of the six-phase permanent magnet motor under healthy operation in the present disclosure.

The present disclosure discloses a low-vibration fault-tolerant current algorithm for six-phase permanent magnet motors under the open-phase faults, which includes the following steps:

Step 1: As shown in FIG. 2, the distributed six-phase winding is adopted to the permanent magnet motor in the present disclosure, and the phase vectors of each phase are uniformly distributed in the slot space at 0, 60°, 120°, 180°, 240°, and 300°. To ensure that the phase angle of the remaining phase current is not affected when one or more phases have open-circuit fault, a full-bridge driving mode with high electrical isolation is used for inverter power supply, as shown in FIG. 3. An electromagnetic finite element simulation model of the motor is established, and the torque under the healthy operation is simulated as shown in FIG. 4. At this time, the rated torque of the motor is 100 Nm, and the rated torque ripple is only 7%. The torque output capacity under healthy operation is good. Numerical calculations are carried out using electromagnetic finite element simulation software for the simulation of torque, magnetomotive force, and radial force distribution under the load condition.

The magnetomotive force under healthy operation is represented as the product of the fundamental winding function and the current function of the motor. The fundamental winding function of the motor is expressed as:

$$n_{A,B,C\ldots}(\theta) = C_p \cdot N \cos\left[p\theta - \frac{(k-1)}{6} \cdot 360°\right]. \quad (1)$$

The current function can be expressed as:

$$i_{A,B,C\ldots}(t) = I_m \cos\left[\omega t - \frac{(k-1)}{6} \cdot 360°\right]. \quad (2)$$

The one-phase fundamental magnetomotive force of the motor can be expressed as:

$$f_k = 0.5 C_p \cdot NI_m \left[\underbrace{\cos(p\theta - \omega t)}_{Forward} + \underbrace{\cos(p\theta + \omega t - 120° \cdot k - 120°)}_{Reverse}\right]. \quad (3)$$

Figure 5:
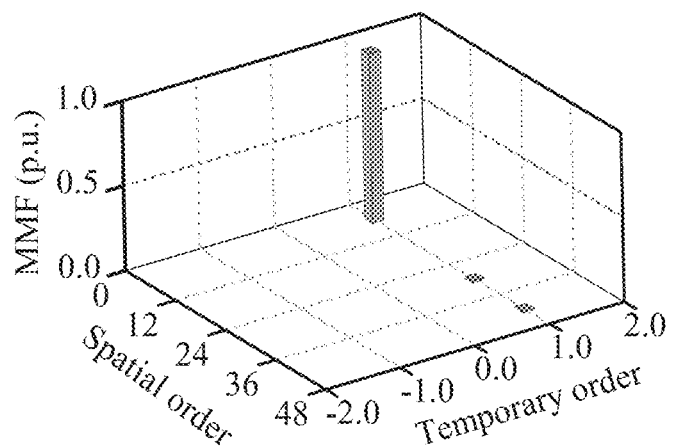
FIG. 5 shows the Fourier decomposition of the winding magnetic potential of the six-phase permanent magnet motor under the healthy operation in the present disclosure.

The synthetic fundamental magnetomotive force function of the motor can be expressed as:

$$f_0 = \sum_{k=1,2,3\ldots} f_k = 3 C_p \cdot NI_m \quad (4)$$

where, $n_{A,B,C\ldots}(\theta)$ represents the fundamental winding function from phase A to phase F. N is the number of turns in the stator winding, $C_p$ is the calculation coefficient of the fundamental winding function, p represents the number of rotor pole pairs, and k represents the numerical characterization of phase A to phase F. Phases A to F are spatially phased at 60°, 120°, 180°, 240°, 300°, and 360°, respectively. $i_{A,B,C\ldots}$ represents the current function from phase A to phase F, θ represents the mechanical position angle, $I_m$ represents the current amplitude, and ω represents the electric angular velocity. $f_0$ is the synthesized magnetic flux of six phases, and $f_k$ represents the fundamental winding magnetomotive force of one phase. The first half represents the forward fundamental magnetomotive force component, while the second half represents the reverse fundamental magnetomotive force component. As shown in FIG. 5, the harmonic content, except for the forward fundamental magnetomotive force component, is relatively small in the distribution of the armature magnetomotive force under the healthy operation.

The main radial force component that contributes to vibration under the healthy operation is the 12th order radial force with twice electrical frequency. The vibration response verified by simulation is mainly the vibration acceleration response. The specific simulation method is as follows:

Firstly, the established finite element motor model is simulated and solved, and the obtained stator tooth surface radial force data of the motor is collected. Secondly, using structural finite element analysis software to simulate the modal parameters of the motor structure, the natural frequency data of each order of the motor is obtained. Finally, in the harmonic response calculation software, the radial force data and finite element modal parameters obtained are imported to couple the vibration acceleration response. The relationship between radial force and vibration acceleration is verified. The radial force component that plays a major role in vibration acceleration is clarified.

Figure 6:
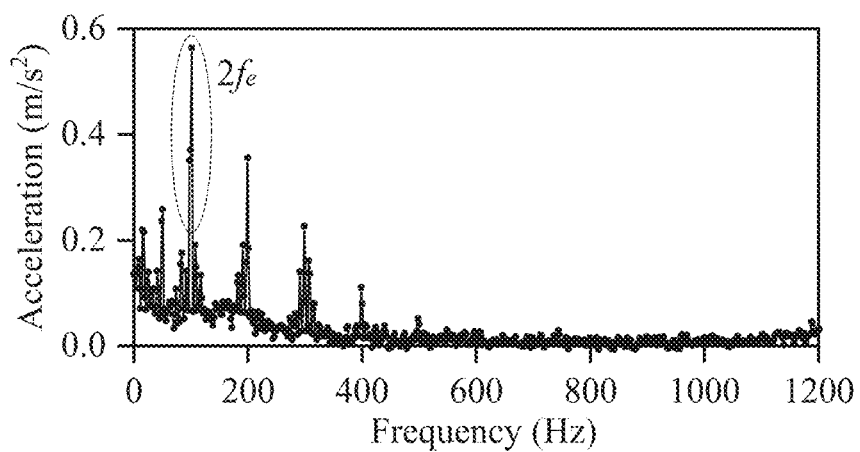
FIG. 6 shows the distribution of vibration acceleration of the six-phase permanent magnet motor under the healthy operation in the present disclosure.
Figure 7A:
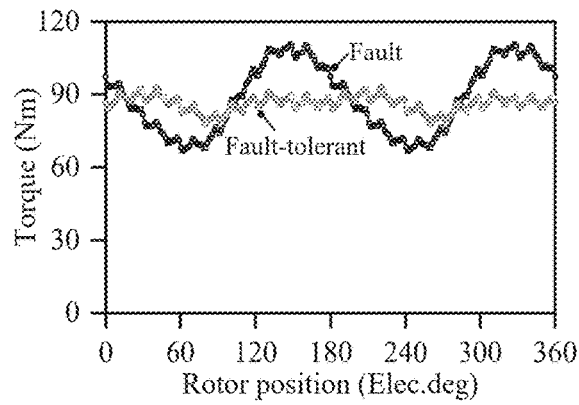
FIGS. 7A-7D show the rated torque waveform before and after the application of low-vibration fault-tolerant current in the six-phase permanent magnet motor in the present disclosure.
Figure 7B:
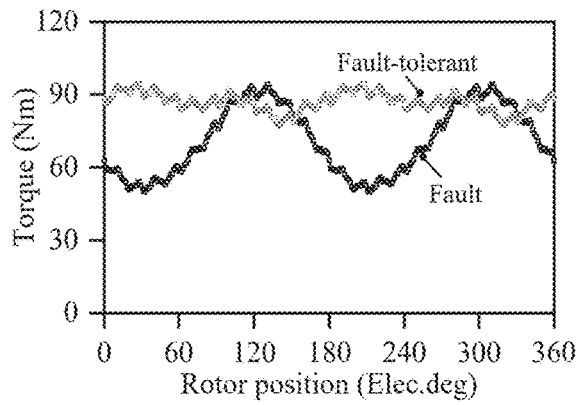
Figure 7C:
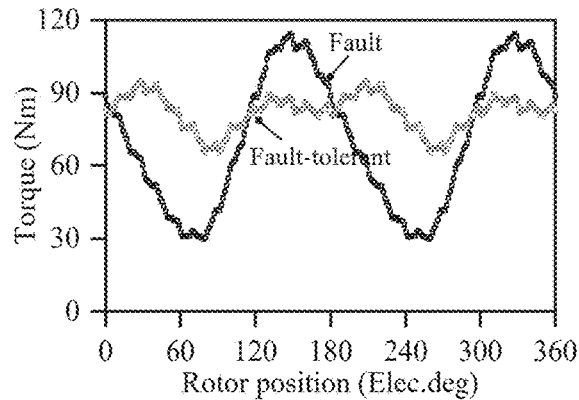
Figure 7D:
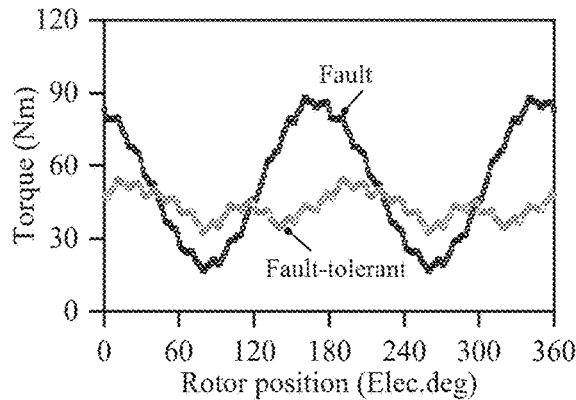

As shown in FIG. 6, the main vibration acceleration under the healthy operation is located at the twice electrical frequency, which is consistent with the frequency of the main radial force under the healthy operation.

Step 2: The distribution of torque, magnetomotive force, and radial force under various open-phase faults are simulated. The numerical calculation of torque and magnetomotive force simulation is carried out using electromagnetic finite element analysis software. The values of the forward fundamental magnetomotive force and average torque under different open-phase faults are compared. The expressions for the forward fundamental magnetomotive force and average torque of the motor under open-phase faults are:

$$\begin{cases} f_{fau\_foward}(m) = \frac{6-m}{6} \cdot f_{0\_foward} \\ T_{fault}(m) = \frac{6-m}{6} \cdot T_e \end{cases} \quad (5)$$

where $f_{fau\_forward}$ represents the fundamental forward magnetomotive force value under open-phase faults, $f_{0\_forward}$ represents the fundamental forward magnetomotive force value under the healthy operation, $T_{fault}$ represents the average torque value under open-phase faults, $T_e$ represents the rated torque value under the healthy operation, and m represents the number of open-phase faults.

The types of open-phase faults include one-phase open-phase fault, adjacent two-phase open-phase fault, non-adjacent two-phase open-phase fault, and three-phase open-phase fault. As shown in FIGS. 7A-7D, under different types of open-phase faults, the output average torque and torque pulsation vary greatly.

Figure 8:
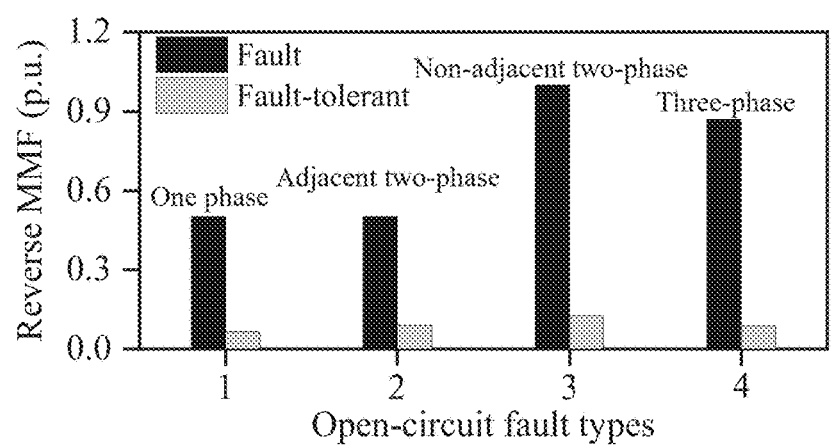
FIG. 8 shows the comparison of the commutation magnetic potential normalized value of the armature fundamental wave before and after the application of low-vibration fault-tolerant current in the six-phase permanent magnet motor in the present disclosure.

Analyzing the simulated magnetomotive force distribution under open-circuit faults, as shown in FIG. 8, the one-phase open-phase, adjacent two-phase open-phase, non-adjacent two-phase open-phase, and some three-phase open-phase faults will produce fundamental reverse magnetomotive force components. The magnitudes of the fundamental reverse magnetomotive force components generated by different types of open-phase faults are not the same. Among them, the three-phase open-phase situation is particularly special. There are a total of twenty combinations (any 3-phase combination out of 6 phases), and eight of them do not generate fundamental reverse magnetic flux components under three-phase open-circuit, as listed in Table 1. Therefore, the vibration response under these eight three-phase open-phase combinations will not deteriorate. For the remaining twelve three-phase open-phase situations, fundamental reverse magnetomotive force can be generated, which will further deteriorate the vibration response.

TABLE 1

Certain Three-Phase Open-Circuit Fault Combinations

| Number | Combinations |
|---|---|
| 1 | (Phase A, Phase B, Phase C) |
| 2 | (Phase A, Phase B, Phase F) |
| 3 | (Phase A, Phase C, Phase E) |
| 4 | (Phase A, Phase E, Phase F) |
| 5 | (Phase B, Phase C, Phase D) |
| 6 | (Phase B, Phase D, Phase F) |

TABLE 1-continued

Certain Three-Phase Open-Circuit Fault Combinations

| Number | Combinations |
|---|---|
| 7 | (Phase C, Phase D, Phase E) |
| 8 | (Phase D, Phase E, Phase F) |

The magnetomotive force distribution under different types of open-phase faults is calculated in four situations. Due to the uniform and symmetric distribution of each phase winding in space, four typical operating conditions can be selected for magnetomotive force calculation under different open-phase faults. Specifically, taking the phase A open circuit as an example to represent one-phase open-circuit fault, the synthesized magnetomotive force can be expressed as:

$$f_{q1} = f_B + f_C + f_D + f_E + f_F \quad (6)$$
$$= \underbrace{2.5C_p \cdot NI_m \cos(p\theta - \omega t)}_{Forward} + \underbrace{0.5C_p \cdot NI_m \cos(p\theta + \omega t - 180°)}_{Reverse}$$

where, $f_{q1}$ represents the synthesized magnetomotive force of the remaining five phases, and $f_B$, $f_C$, $f_D$, $f_E$, $f_F$ represent the one-phase magnetomotive force of phases B, C, D, E, and F, respectively.

Taking the phase A and B open circuit as an example to represent adjacent two-phase open-phase fault, $f_{q\_ad2}$ represents the synthesized magnetomotive force of the remaining adjacent four phases, which can be expressed as:

$$f_{q\_ad2} = f_C + f_D + f_E + f_F \quad (7)$$
$$= \underbrace{2C_p \cdot NI_m \cos(p\theta - \omega t)}_{Forward} + \underbrace{0.5C_p \cdot NI_m \cos(p\theta + \omega t - 120°)}_{Reverse}.$$

Taking the phase A and D open circuit as an example to represent non-adjacent two-phase open-phase fault, $f_{q\_nonad2}$ represents the synthesized magnetomotive force of the remaining non-adjacent four phases, which can be expressed as:

$$f_{q\_nomad2} = f_B + f_C + f_D + f_E + f_F \quad (6)$$
$$= \underbrace{2C_p \cdot NI_m \cos(p\theta - \omega t)}_{Forward} + \underbrace{C_p \cdot NI_m \cos(p\theta + \omega t - 180°)}_{Reverse}.$$

Taking phase A, B and D open circuit as an example to represent three-phase open-phase fault, $f_{q3}$ represents the synthesized magnetomotive force of the remaining three phases, which can be expressed as:

$$f_{q3} = f_C + f_E + f_F \quad (9)$$
$$= \underbrace{1.5C_p \cdot NI_m \cos(p\theta - \omega t)}_{Forward} + \underbrace{0.87C_p \cdot NI_m \cos(p\theta + \omega t - 150°)}_{Reverse}.$$

Figure 9:
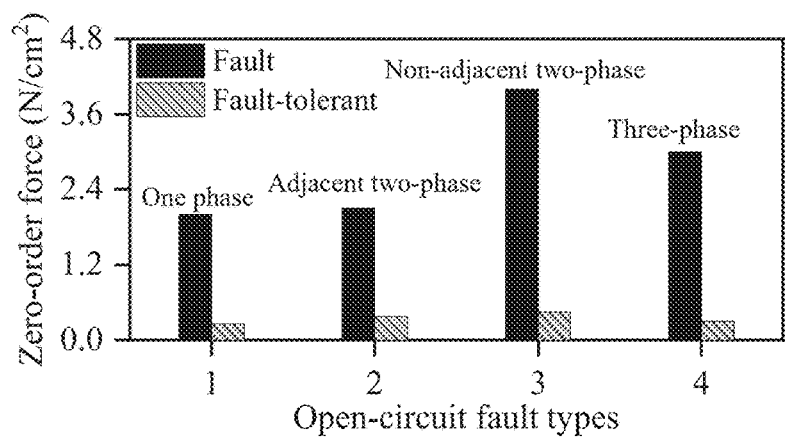
FIG. 9 shows the comparison of the zero-order radial force value before and after the application of low-vibration fault-tolerant current in the six-phase permanent magnet motor winding in the present disclosure.
Figure 10A:
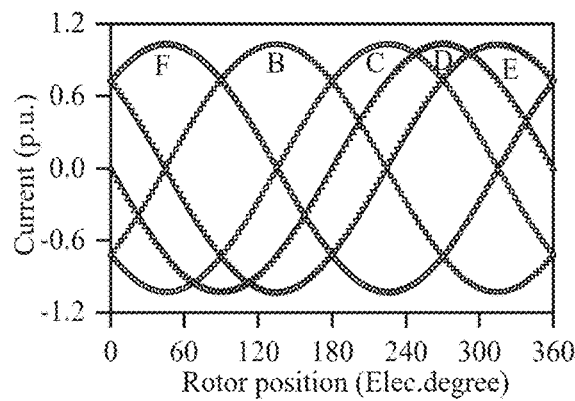
FIGS. 10A-10D show the waveform of the low-vibration fault-tolerant current for different open-phase faults in the six-phase permanent magnet motor in the present disclosure.
Figure 10B:
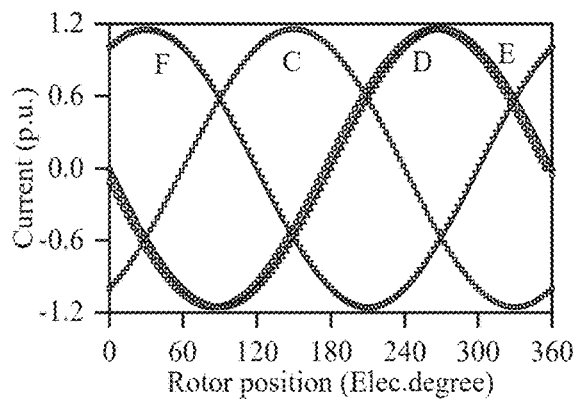
Figure 10C:
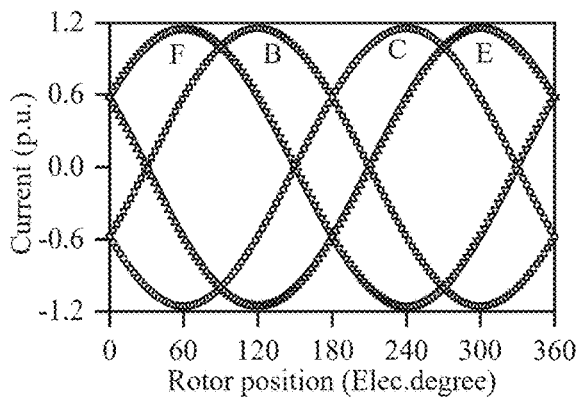
Figure 10D:
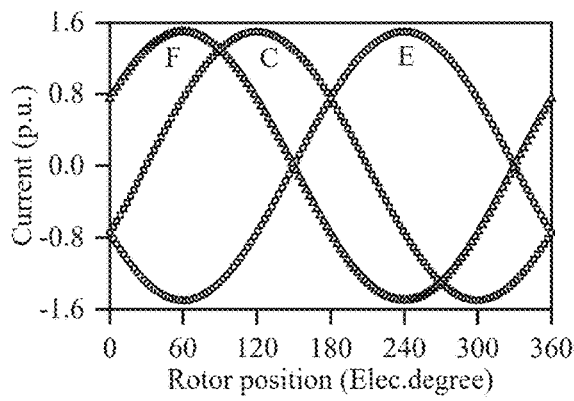
Figure 11A:
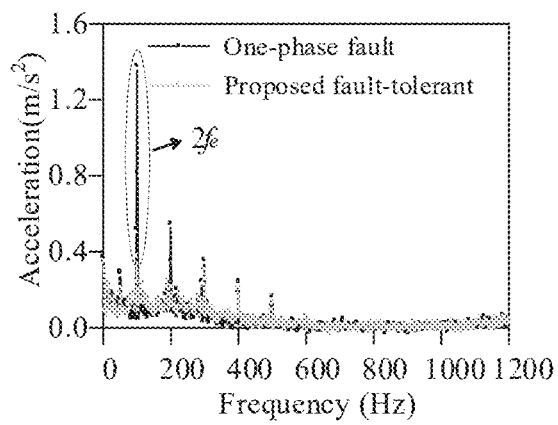
FIGS. 11A-11D show the comparison of the vibration acceleration effect before and after the application of low-vibration fault-tolerant current in the present disclosure.
Figure 11B:
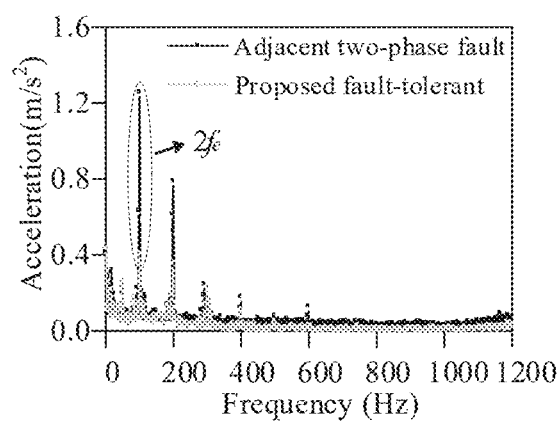
Figure 11C:
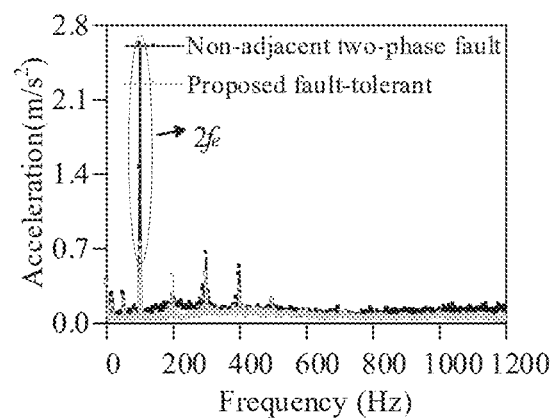
Figure 11D:
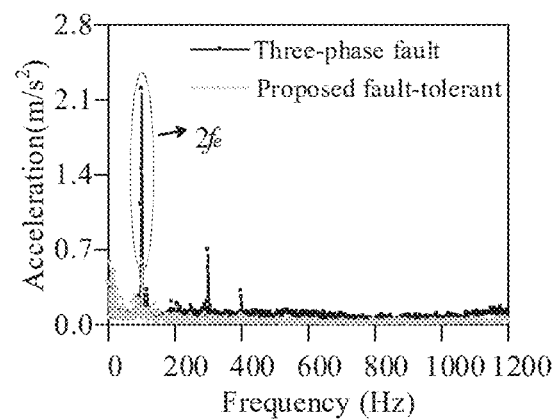

The radial force distribution under open-phase faults is further simulated. According to the Maxwell stress equation, the zero-order radial force component are generated by the interaction between the fundamental reverse and forward magnetomotive force, which excites zero-order vibration and deteriorates vibration response. As shown in FIG. 9, the radial force distribution characteristics under open-phase faults coincide with those of the magnetomotive force distribution under open-phase faults.

Among them, the zero-order vibration excited by the zero-order radial force mainly contributes to the vibration response under the open-phase faults. Specifically, the ratio of the zero-order vibration displacement excited by a unit zero-order radial force compared to the vibration displacement excited by an initial unit lowest-order radial force can be expressed as:

$$\frac{Y_{s=0}}{Y_{s=2p}} = \frac{(4p^2 - 1)^2}{12} \left(\frac{T_y}{R_y}\right)^2 \approx 17 \quad (10)$$

Where $Y_{s=0}$ represents the zero-order vibration displacement, $Y_{s=2p}$ represents the vibration displacement excited by the lowest-order radial force, $R_y$ represents the average radius of the stator yoke, which is 200 mm in the implemented motor, and $T_y$ represents the average thickness of the stator yoke, which is 20 mm in the implemented motor. After calculation, this ratio is 17. Therefore, the effect of the zero-order vibration is significant.

Step 3: the differences in magnetomotive force distribution under various types of open-fault faults are addressed by reconfiguring the synthesized magnetomotive force of the remaining phases to improve vibration response under open-phase operation. The principle of reconfiguring the fundamental magnetomotive force is to ensure the maximum amplitude of the fundamental forward armature magnetomotive force and eliminate the fundamental reverse armature magnetomotive force as much as possible. Four typical open-phase conditions are selected to further design low-vibration magnetomotive force reconfiguration methods and determine the phase angle of the remaining phase currents.

Taking phase A open circuit as an example to represent one-phase open circuit, as the remaining five-phase winding is symmetrically distributed about the D-phase winding, assuming the phase angles of phase B and F are $-\alpha 1$ and $\alpha 1$, the phase angles of phase C and E are $-\beta 1$ and $\beta 1$, respectively. Then, the fundamental magnetomotive force of the remaining phases is represented as:

$$\begin{cases} f'_B = 0.5C_p \cdot NI_m \cos(p\theta - \alpha_1)\cos(\omega t - 60°) \\ f'_C = 0.5C_p \cdot NI_m \cos(p\theta - \beta_1)\cos(\omega t - 120°) \\ f'_D = 0.5C_p \cdot NI_m \cos(p\theta - 180°)\cos(\omega t - 180°) \\ f'_E = 0.5C_p \cdot NI_m \cos(p\theta + \beta_1)\cos(\omega t + 120°) \\ f'_F = 0.5C_p \cdot NI_m \cos(p\theta + \alpha_1)\cos(\omega t + 60°) \end{cases} \quad (11)$$

where, $f'_A$, $f'_B$, $f'_C$, $f'_D$, $f'_E$ and $f'_F$ represent the reconfigured magnetomotive force expressions for phase B, C, D, E, and F, respectively. The reconfigured five phase synthetic magnetomotive force can be expressed as:

$$f'_{q1} = f'_B + f'_C + f'_D + f'_E + f'_F = \quad (12)$$
$$\underbrace{0.25C_p \cdot NI_m \cos(p\theta - \omega t) \cdot [2\cos(60° - \alpha_1) + 2\cos(120° - \beta_1)]}_{Forward} +$$
$$\underbrace{0.25C_p \cdot NI_m \cos(p\theta + \omega t) \cdot [2\cos(60° + \alpha_1) + 2\cos(120° + \beta_1)]}_{Reverse}$$

After calculation, when $\alpha_1$ is 45° and $\beta_1$ is 135°, the forward fundamental magnetomotive force is maximized, and the reverse fundamental magnetomotive force is eliminated, achieving low-vibration magnetomotive force reconfiguration for one-phase open circuit.

Taking phase A and B open circuit as an example to represent adjacent two-phase open-phase faults, since the remaining four-phase winding is symmetrically distributed, with phase C and F, phase D and E being symmetrical. Assuming the phase angles of phase C and F are $-\alpha_2$ and $\alpha_2$, the phase angles of phase D and E are $-\beta_2$ and $\beta_2$, respectively. Then, the fundamental magnetomotive force of the reconfigured remaining four phases is expressed as:

$$\begin{cases} f'_C = 0.5C_p \cdot NI_m\cos(p\theta - \alpha_2)\cos(\omega t - 120°) \\ f'_D = 0.5C_p \cdot NI_m\cos(p\theta - \beta_2)\cos(\omega t - 180°) \\ f'_E = 0.5C_p \cdot NI_m\cos(p\theta + \beta_2)\cos(\omega t + 120°) \\ f'_F = 0.5C_p \cdot NI_m\cos(p\theta + \alpha_2)\cos(\omega t + 60°) \end{cases} \quad (13)$$

The reconfigured four phase synthetic magnetomotive force can be expressed as:

$$f'_{q\_ad2} = f'_C + f'_D + f'_E + f'_F$$
$$= \underbrace{0.25C_p \cdot NI_m\cos(p\theta - \omega t + 30°) \cdot [2\cos(90° - \alpha_2) + 2\cos(150° - \beta_2) + 1]}_{Forward} +$$
$$\underbrace{0.25C_p \cdot NI_m\cos(p\theta + \omega t - 30°) \cdot [2\cos(90° + \alpha_2) + 2\cos(150° + \beta_2) + 1]}_{Reverse}$$

After calculation, when $\alpha_2$ is 60° and $\beta_2$ is 180°, the forward fundamental magnetomotive force is maximized, and the reverse fundamental magnetomotive force is eliminated, achieving low-vibration magnetomotive force reconfiguration for adjacent two-phase open-phase fault.

Taking phase A and D open circuit as an example to represent non-adjacent two-phase open-phase fault, since the remaining four-phase winding is symmetrically distributed, with phase B and F, phase C and E being symmetrical. Assuming the phase angles of phase B and F are $-\alpha_3$ and $\alpha_3$, the phase angles of phase C and E are $-\beta_3$ and $\beta_3$, respectively. Then, the fundamental magnetomotive force of the reconfigured remaining four phases is expressed as:

$$\begin{cases} f'_B = 0.5C_p \cdot NI_m\cos(p\theta - \alpha_3)\cos(\omega t - 60°) \\ f'_C = 0.5C_p \cdot NI_m\cos(p\theta - \beta_3)\cos(\omega t - 120°) \\ f'_E = 0.5C_p \cdot NI_m\cos(p\theta + \beta_3)\cos(\omega t + 120°) \\ f'_F = 0.5C_p \cdot NI_m\cos(p\theta + \alpha_3)\cos(\omega t + 60°) \end{cases} \quad (15)$$

The reconfigured four phase synthetic magnetomotive force can be expressed as:

$$f'_{q\_nomad2} = f'_B + f'_C + f'_D + f'_E + f'_F$$
$$= \underbrace{0.25C_p \cdot NI_m\cos(p\theta - \omega t) \cdot [2\cos(60° - \alpha_3) + 2\cos(120° - \beta_3)]}_{Forward} +$$
$$\underbrace{0.25C_p \cdot NI_m\cos(p\theta + \omega t) \cdot [2\cos(60° + \alpha_3) + 2\cos(120° + \beta_3)]}_{Reverse}$$

After calculation, when $\alpha_3$ is 30° and $\beta_3$ is 150°, the forward fundamental magnetomotive force is maximized, and the reverse fundamental magnetomotive force is eliminated, achieving low-vibration magnetomotive force reconfiguration for non-adjacent two-phase open-fault fault.

Taking phase A, B, and D open circuit as an example to represent adjacent three-phase open-fault faults, in the remaining three-phase winding, assuming phase C and F are symmetrically distributed with respect to phase E. The phase angles of phase C and F are $-\alpha_4$ and $\alpha_4$, and the phase angle of phase E is 150°. Then, the fundamental magnetomotive force of the reconfigured remaining three phases is expressed as:

$$\begin{cases} f'_C = 0.5C_p \cdot NI_m\cos(p\theta - \alpha_4)\cos(\omega t - 120°) \\ f'_E = 0.5C_p \cdot NI_m\cos(p\theta - 150°)\cos(\omega t - 150°) \\ f'_F = 0.5C_p \cdot NI_m\cos(p\theta + \alpha_4)\cos(\omega t + 60°) \end{cases} \quad (17)$$

The reconfigured three phase synthetic magnetomotive force can be expressed as:

$$f'_{q3} = f'_C + f'_E + f'_F \quad (18)$$
$$= \underbrace{0.25C_p \cdot NI_m\cos(p\theta - \omega t + 30°) \cdot [2\cos(90° - \alpha_4) + 1]}_{Forward} +$$
$$\underbrace{0.25C_p \cdot NI_m\cos(p\theta + \omega t - 30°) \cdot [2\cos(90° + \alpha_4) + 1]}_{Reverse}$$

After calculation, it has been determined that when $\alpha_4$ is 30°, the forward fundamental magnetomotive force is maximized, and the reverse fundamental magnetomotive force is eliminated, achieving low-vibration magnetomotive force reconfiguration for three-phase open-phase fault.

Step 4: After determining the phase angle of the reconfigured current, the expression for the low-vibration fault-tolerant current can be obtained. The four typical open-phase conditions are used as examples.

Taking phase A open circuit as an example to represent one-phase open-circuit fault, the forward synthetic magnetomotive force of the remaining five phases $f_5(\theta,t)$ can be expressed as:

$$f_5(\theta,t) = 0.25C_p \cdot NI_m \cdot 4.86 \cos(\omega t - p\theta) \quad (19)$$

The relationship between the remaining five phase low-vibration fault-tolerant current $I_{con}$ and the initial current amplitude $I_m$ is:

$$I_{con} = \frac{0.25 C_p \cdot NI_m \cdot 5}{0.25 C_p \cdot NI_m \cdot 4.85} \cdot I_m = 1.03 I_m \quad (20)$$

Hence, the remaining five phase low vibration fault-tolerant current can be expressed as:

$$\begin{cases} I'_B = 1.03 I_m \cos(\omega t - 45°) \\ I'_C = 1.03 I_m \cos(\omega t - 135°) \\ I'_D = 1.03 I_m \cos(\omega t - 180°) \\ I'_E = 1.03 I_m \cos(\omega t + 135°) \\ I'_F = 1.03 I_m \cos(\omega t + 45°) \end{cases} \quad (21)$$

where, $I'_B$, $I'_C$, $I'_D$, $I'_E$ and $I'_F$ represent the low-vibration fault-tolerant current expressions for phases B, C, D, E, and F, respectively.

Taking phase A and B open circuit as an example to represent adjacent two-phase open-fault fault, the forward synthetic magnetomotive force of the remaining four phases $f_4(\theta,t)$ can be expressed as:

$$f_4(\theta,t) = 0.25 C_p \cdot NI_m \cdot 3.46 \cos(\omega t - p\theta) \quad (22)$$

The relationship between the remaining four phase low-vibration fault-tolerant current $I_{con}$ and the initial current amplitude $I_m$ is:

$$I_{con} = \frac{0.25 C_p \cdot NI_m \cdot 4}{0.25 C_p \cdot NI_m \cdot 3.46} \cdot I_m = 1.16 I_m \quad (23)$$

Hence, the remaining four phase low vibration fault-tolerant current can be expressed as:

$$\begin{cases} I'_C = 1.16 I_m \cos(\omega t - 60°) \\ I'_D = 1.16 I_m \cos(\omega t - 180°) \\ I'_E = 1.16 I_m \cos(\omega t + 180°) \\ I'_F = 1.16 I_m \cos(\omega t + 60°) \end{cases} \quad (24)$$

Taking phase A and D open circuit as an example to represent non-adjacent two-phase open-fault fault, the forward synthetic magnetomotive force of the remaining four phases $f_4(\theta,t)$ can be expressed as:

$$f_4(\theta,t) = 0.25 C_p \cdot NI_m \cdot 3.46 \cos(\omega t - p\theta) \quad (25)$$

The relationship between the remaining four phase low-vibration fault-tolerant current $I_{con}$ and the initial current amplitude $I_m$ is:

$$I_{con} = \frac{0.25 C_p \cdot NI_m \cdot 4}{0.25 C_p \cdot NI_m \cdot 3.46} \cdot I_m = 1.16 I_m \quad (26)$$

Hence, the remaining four phase low vibration fault-tolerant current can be expressed as:

$$\begin{cases} I'_B = 1.16 I_m \cos(\omega t - 30°) \\ I'_C = 1.16 I_m \cos(\omega t - 150°) \\ I'_E = 1.16 I_m \cos(\omega t + 150°) \\ I'_F = 1.16 I_m \cos(\omega t + 30°) \end{cases} \quad (27)$$

Taking phase A, B and D open circuit as an example to represent three-phase open-fault fault, the forward synthetic magnetomotive force of the remaining four phases $f_3(\theta,t)$ can be expressed as:

$$f_3(\theta,t) = 0.25 C_p \cdot NI_m \cdot 2 \cos(\omega t - p\theta) \quad (28)$$

The relationship between the remaining three phase low-vibration fault-tolerant current $I_{con}$ and the initial current amplitude $I_m$ is:

$$I_{con} = \frac{0.25 C_p \cdot NI_m \cdot 3}{0.25 C_p \cdot NI_m \cdot 2} \cdot I_m = 1.5 I_m \quad (29)$$

Hence, the remaining three phase low vibration fault-tolerant current can be expressed as:

$$\begin{cases} I'_C = 1.5 I_m \cos(\omega t - 30°) \\ I'_E = 1.5 I_m \cos(\omega t - 150°) \\ I'_F = 1.5 I_m \cos(\omega t + 30°) \end{cases} \quad (30)$$

Referring to FIGS. 10A-10D, the waveform of low-vibration fault-tolerant current for four typical operating conditions based on the expressions can be drawn.

Step 5: substituting the calculated low-vibration fault-tolerant current expressions as the excitation into the armature winding, the torque waveform, reverse magnetomotive force distribution, and radial force distribution can be calculated numerically by using electromagnetic finite element simulation software.

As shown in FIG. 7, the adopting of low-vibration fault-tolerant current can effectively suppress torque ripple for all four types of open-phase faults, with a reduction of 32.3% in torque ripple for one-phase open-phase fault, 42.8% for adjacent two-phase open-phase fault, 83.4% for non-adjacent two-phase open-phase fault, and 83.3% for three-phase open-phase fault.

As shown in FIG. 8, the adopting of low-vibration fault-tolerant current can effectively suppress reverse magnetomotive force for all four types of open-phase faults, with a reduction of 87% in amplitude for one-phase open-phase fault, 82% for adjacent two-phase open-phase fault, 82.5% for non-adjacent two-phase open-phase fault, and 90% for three-phase open-phase fault.

As shown in FIG. 9, when low-vibration fault-tolerant current is adopted, the amplitude of zero-order radial force distribution for all four types of open-phase faults is significantly reduced. The amplitude of zero-order radial force is reduced by 86.2% for one-phase open-phase fault, 82.6% for adjacent two-phase open-phase fault, 82% for non-adjacent two-phase open-phase fault, and 91% for three-phase open-phase fault.

Furthermore, vibration acceleration simulation is performed to verify the improvement in vibration acceleration when the low-vibration fault-tolerant current is used. As shown in FIGS. 11A-11D, the vibration amplitude at the twice electrical frequency is reduced by 71.4% for one-phase open-phase fault, 69.6% for adjacent two-phase open-phase fault, 74.1% for non-adjacent two-phase open-phase fault, and 77.8% for three-phase open-phase fault.

Figure 12:
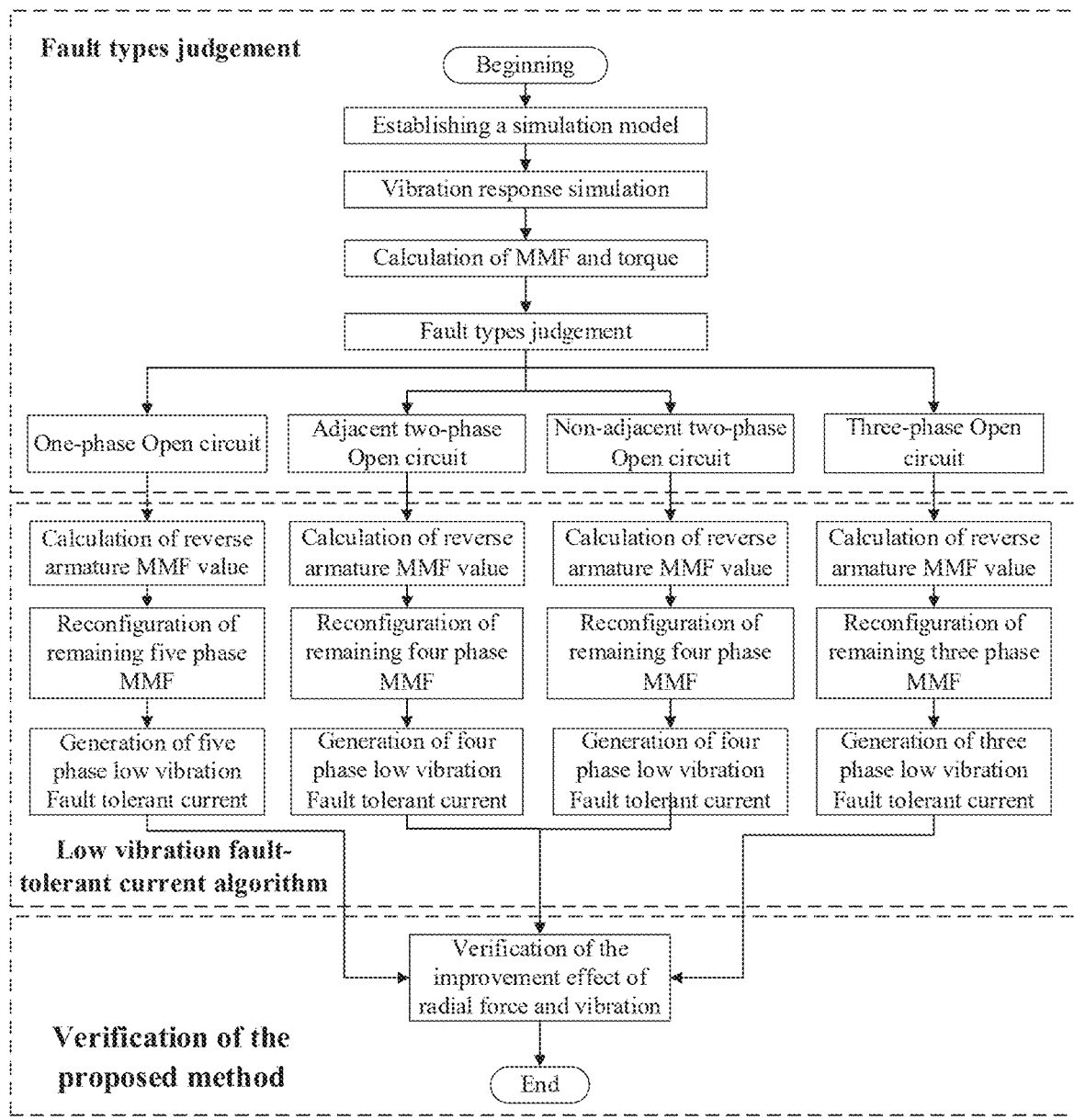
FIG. 12 shows a low-vibration fault-tolerant current algorithm flow chart for six-phase permanent magnet motors with open-phase faults.

The specific process of all the steps mentioned above is shown in FIG. 12, which mainly includes fault type judgment, calculation of low-vibration fault-tolerant current algorithm, and verification of low-vibration fault-tolerant effect. Although the best embodiment of the invention has been disclosed above, the embodiment is not intended to limit the invention. Any equivalent modification or improvement made within the spirit and scope of the invention is within the protection scope defined by the appended claims of the present application.

What is claimed is:

1. A low-vibration fault-tolerant current algorithm for open-phase faults of six-phase permanent magnet motors, comprising specific steps as follows:

step 1: establishing an electromagnetic simulation model of the motor and simulating a torque, magnetomotive force distribution, and radial force distribution of the six-phase permanent magnet motor under a healthy operation, and measuring a vibration response of the motor;

step 2: dividing different types of open-phase faults of the six-phase permanent magnet motor, simulating the torque and magnetomotive force distribution under different open-phase faults, and simulating the radial force distribution and vibration response under different open-phase faults;

step 3: based on a difference in magnetomotive force distribution under different open-phase faults, designing a synthetic magnetomotive force of remaining phase windings under different open-phase faults;

step 4: according to a reconfiguration scheme of the synthetic magnetomotive force of the remaining phase windings, determining a phase angle of a remaining phase current, and solving for an expression for low-vibration fault-tolerant current; and step 5: substituting the calculated expression for low-vibration fault-tolerant current into the simulation model and simulating the radial force distribution under a fault-tolerant operation, and verifying an improvement in the vibration response under the fault-tolerant operation.

2. The low-vibration fault-tolerant current algorithm for the open-phase faults of the six-phase permanent magnet motors according to claim 1, the permanent magnet motor adopts a full-bridge driving mode for power supply to each phase winding, which has a high electrical isolation and is conducive to a fault-tolerant control under open-phase faults; main parts of the permanent magnet motor comprises a stator core, an armature winding, a rotor core, and permanent magnets; the stator core and the rotor core are made of silicon steel sheets, and the permanent magnets are made of high remanence neodymium magnet materials; and an arrangement of the permanent magnet can use a surface mounted or embedded structure.

3. The low-vibration fault-tolerant current algorithm for the open-phase faults of the six-phase permanent magnet motors according to claim 1, in step 1, the simulation of the torque, magnetomotive force distribution, and radial force distribution under the healthy operation is calculated using an electromagnetic finite element simulation software; for the six-phase permanent magnet motor, a radial force component that contributes the most to vibration under the healthy operation is a poles number order radial force with a twice electrical frequency;

the magnetomotive force under the healthy operation is represented as a product of a fundamental winding function and current function, wherein the fundamental winding function is expressed as:

$$n_{A,B,C\ldots}(\theta) = C_p \cdot N \cos\left[p\theta - \frac{(k-1)}{6} \cdot 360°\right] \quad (1)$$

the current function can be expressed as:

$$i_{A,B,C\ldots}(t) = I_m \cos\left[\omega t - \frac{(k-1)}{6} \cdot 360°\right] \quad (2)$$

a one-phase fundamental winding function can be expressed as:

$$f_k = 0.5 C_p \cdot NI_m \left[\underbrace{\cos(p\theta - \omega t)}_{Forward} + \underbrace{\cos(p\theta + \omega t - 120° \cdot k - 120°)}_{Reverse}\right] \quad (3)$$

the synthetic magnetomotive force can be expressed as:

$$f_0 = \sum_{k=1,2,3\ldots} f_k = 3 C_p \cdot NI_m \quad (4)$$

wherein $n_{A,B,C\ldots}(\theta)$ represents the fundamental winding function from phase A to phase F, N represents a number of turns in a stator winding, $C_p$ represents a calculation coefficient for the fundamental winding function, p represents a number of poles of a rotor, k represents a numerical representation from phase A to phase F, and spatial phase angles of phase A to F are staggered 60°, 120°, 180°, 240°, 300°, and 360°, respectively; $i_{A,B,C\ldots}$ represents the current function from phase A to F, $\theta$ represents a mechanical position angle, $I_m$ represents a current amplitude, and $\omega$ represents an electrical angular frequency; $f_0$ represents the six-phase synthetic magnetomotive force, and $f_k$ represents a one-phase fundamental magnetomotive force, wherein a first part represents a forward fundamental magnetomotive force component and a second part represents a reverse fundamental magnetomotive force component.

4. The low-vibration fault-tolerant current algorithm for the open-phase faults of the six-phase permanent magnet motors according to claim 1, in step 1, the main vibration response is a vibration acceleration response, and the specific steps for measuring the vibration response are as follows:

step 1.1: solving an established finite element model by simulation and collecting stator tooth surface radial force data of the motor;

step 1.2: using a structure finite element calculation software to simulate modal parameters of a motor structure and obtaining natural frequency data of each order modal of the motor; and step 1.3: in a harmonic response calculation software, importing radial force data and finite element modal parameters obtained, and coupling the calculation of the vibration acceleration response, verifying a relationship between a radial force and a vibration acceleration, and recognizing the radial force component that plays a main role in the vibration acceleration.

5. The low-vibration fault-tolerant current algorithm for the open-phase faults of the six-phase permanent magnet motors according to claim 1, in step 2, the torque and magnetomotive force distribution under different open-phase faults is simulated and calculated using an electromagnetic finite element simulation software; a fundamental forward magnetomotive force value and an average torque value of the motor are compared under different open-phase faults; expressions for the fundamental forward magnetomotive force value and the average torque under the open-phase fault are expressed as:

$$\begin{cases} f_{fau\_forward}(m) = \dfrac{6-m}{6} \cdot f_{0\_forward} \\ T_{fault}(m) = \dfrac{6-m}{6} \cdot T_e \end{cases} \quad (5)$$

wherein $f_{fau\_forward}$ represents the fundamental forward magnetomotive force value under the open-phase fault, $f_{0\_forward}$ represents the fundamental forward magnetomotive force value under the healthy operation, $T_{fault}$ represents the average torque value under the open-phase fault, $T_e$ represents a rated torque value under the healthy operation, and m represents a number of the open phases.

6. The low-vibration fault-tolerant current algorithm for the open-phase faults of the six-phase permanent magnet motors according to claim 1, in step 2, the radial force distribution under different open-phase faults is as follows:
the open-fault types comprise a one-phase open-phase fault, an adjacent two-phase open-phase fault, a non-adjacent two-phase open-phase fault, and a three-phase open-phase fault, wherein, the one-phase open-phase fault, the adjacent two-phase open-phase fault, and the non-adjacent two-phase open-phase fault will produce a reverse fundamental magnetomotive force component; according to Maxwell stress equation, this component will change an original radial force distribution by interacting with a forward fundamental magnetomotive force, and an excite zero-order vibration, thereby deteriorating the vibration response; a situation of the three-phase open-phase fault is particularly special; there are a total of eight combinations of the three-phase open-phase fault that do not produce a reverse fundamental magnetomotive force component; the vibration response of these eight combinations will not be deteriorated; for remaining twelve types of the three-phase open-phase faults, a reverse fundamental magnetomotive force can be produced, which will deteriorate the vibration response; the eight combinations of the three-phase open-phase faults that do not produce a reverse magnetomotive force listed as:

TABLE 1

Certain Three-Phase Open-Circuit Fault Combinations

| Number | Combinations |
|---|---|
| 1 | (Phase A, Phase B, Phase C) |
| 2 | (Phase A, Phase B, Phase F) |
| 3 | (Phase A, Phase C, Phase E) |
| 4 | (Phase A, Phase E, Phase F) |
| 5 | (Phase B, Phase C, Phase D) |
| 6 | (Phase B, Phase D, Phase F) |
| 7 | (Phase C, Phase D, Phase E) |
| 8 | (Phase D, Phase E, Phase F). |

7. The low-vibration fault-tolerant current algorithm for the open-phase faults of the six-phase permanent magnet motors according to claim 1, in step 2, the specific vibration response of the motor under different open-phase faults is as follows:
a zero-order vibration excited by a zero-order radial force mainly contributes to the vibration response under open-phase fault; specifically, a ratio of a zero-order vibration displacement excited by a unit zero-order radial force to a vibration displacement excited by a lowest-order radial force is expressed as:

$$\dfrac{Y_{s=0}}{Y_{s=2p}} = \dfrac{(4p^2-1)^2}{12}\left(\dfrac{T_y}{R_y}\right)^2 \quad (6)$$

wherein $Y_{s=0}$ represents the zero-order vibration displacement, $Y_{s=2p}$ represents the vibration displacement excited by the lowest-order radial force, $R_y$ represents an average radius of a stator yoke, and $T_y$ represents an average thickness of the stator yoke;
the magnetomotive force distribution under different open-phase faults is calculated in four cases; since the phase windings are uniformly and symmetrically distributed in space, typical operating conditions can be selected for a magnetomotive force solving calculation for each of the four open-phase faults;
specifically, if a phase A open circuit is chosen to represent a one-phase open-phase fault, a composite magnetomotive force can be expressed as:

$$f_{q1} = f_B + f_C + f_D + f_E + f_F = \quad (7)$$
$$\underbrace{2.5 C_p \cdot NI_m \cos(p\theta - \omega t)}_{Forward} + \underbrace{0.5 C_p \cdot NI_m \cos(p\theta + \omega t - 180°)}_{Reverse}$$

wherein N represents a number of turns of a stator winding, $C_p$ represents a coefficient of a fundamental winding function, $I_m$ represents a current amplitude, and $\omega$ represents an electrical angular velocity; $f_{q1}$ represents a synthetic magnetomotive force of remaining five phases, and $f_B$, $f_C$, $f_D$, $f_E$ and $f_F$ represent a one-phase magnetomotive force of phases B, C, D, E, and F, respectively;
if the phase A and B open circuit are chosen to represent adjacent two-phase open-phase faults, $f_{q\_ad2}$ represents a synthetic magnetomotive force of remaining four phases and can be expressed as:

$$f_{q\_ad2} = f_C + f_D + f_E + f_F = \quad (8)$$
$$\underbrace{2 C_p \cdot NI_m \cos(p\theta - \omega t)}_{Forward} + \underbrace{0.5 C_p \cdot NI_m \cos(p\theta + \omega t - 120°)}_{Reverse}.$$

if the phase A and D open circuit are chosen to represent non-adjacent two-phase open-phase faults, $f_{q\_nonad2}$ represents the synthetic magnetomotive force of the remaining four phases and can be expressed as:

$$f_{q\_nonad2} = f_B + f_C + f_E + f_F = \quad (9)$$

$$\underbrace{2C_p \cdot NI_m\cos(p\theta - \omega t)}_{Forward} + \underbrace{C_p \cdot NI_m\cos(p\theta + \omega t - 180°)}_{Reverse}.$$

if the phase A, B and D open circuit are chosen to represent three-phase open-phase faults, $f_{q3}$ represents a synthetic magnetomotive force of remaining three phases and can be expressed as:

$$f_{q3} = f_C + f_E + f_F = \quad (10)$$

$$\underbrace{1.5C_p \cdot NI_m\cos(p\theta - \omega t)}_{Forward} + \underbrace{0.87C_p \cdot NI_m\cos(p\theta + \omega t + 150°)}_{Reverse}.$$

8. The low-vibration fault-tolerant current algorithm for the open-phase faults of the six-phase permanent magnet motors according to claim 1, in step 3, the specific process is as follows:
for each type of open-phase faults, the synthetic magnetomotive force of the remaining phases is reconfigured to improve the vibration response under an open-phase operation; a principle of reconfiguring a fundamental magnetomotive force is to ensure a maximum amplitude of a fundamental forward electromotive force and to eliminate an amplitude of a fundamental reverse electromotive force as much as possible; four typical open-phase fault conditions are selected to further design a low-vibration magnetomotive force reconfiguration method and determine a phase angle of a reconfiguration current;
if the phase A open circuit is chosen to represent a one-phase open-phase fault, since remaining five-phase windings are symmetrically distributed about a phase D winding, assuming that phase angles of phase B and F are $-\alpha_1$ and $\alpha_1$, respectively, and the phase angles of phases C and E are $-\beta_1$ and $\beta_1$, respectively, then a reconfigured fundamental magnetomotive force of the remaining phase windings can be expressed as:

$$\begin{cases} f'_B = 0.5C_p \cdot NI_m\cos(p\theta - \alpha_1)\cos(\omega t - 60°) \\ f'_C = 0.5C_p \cdot NI_m\cos(p\theta - \beta_1)\cos(\omega t - 120°) \\ f'_D = 0.5C_p \cdot NI_m\cos(p\theta - 180°)\cos(\omega t - 180°) \\ f'_E = 0.5C_p \cdot NI_m\cos(p\theta + \beta_1)\cos(\omega t + 120°) \\ f'_F = 0.5C_p \cdot NI_m\cos(p\theta + \alpha_1)\cos(\omega t + 60°) \end{cases} \quad (11)$$

wherein N represents a number of turns of a stator winding, $C_p$ represents a coefficient of a fundamental winding function, p represents a pole pair number of a rotor, $f_B$, $f_C$, $f_D$, $f_E$ and $f_F$ represent a one-phase magnetomotive force of phases B, C, D, E, and F, respectively;
a reconfigured five phase synthetic magnetomotive force $f'_{q1}$ can be expressed as:

$$f'_{q1} = f'_B + f'_C + f'_D + f'_E + f'_F = \quad (12)$$

$$\underbrace{0.25C_p \cdot NI_m\cos(p\theta - \omega t) \cdot [2\cos(60° - \alpha_1) + 2\cos(120° - \beta_1)]}_{Forward} +$$

$$\underbrace{0.25C_p \cdot NI_m\cos(p\theta + \omega t) \cdot [2\cos(60° + \alpha_1) + 2\cos(120° + \beta_1)]}_{Reverse}.$$

after calculation, when $\alpha_1$ is 45° and $\beta_1$ is 135°, a maximum forward fundamental magnetomotive force can be achieved and a reverse fundamental magnetomotive force is zero, thus realizing a low-vibration reconfiguration of the magnetomotive force for the one-phase open-phase fault;

if the phase A and B open circuit are chosen to represent an adjacent two-phase open-phase fault, since remaining four phase windings are symmetrically distributed with phase C and F and phase D and phase E, assume that phase angles of phase C and F are $-\alpha_2$ and $\alpha_2$ respectively, and phase angles of phase D and E are $-\beta_2$ and $\beta_2$, respectively, then a reconfigured fundamental magnetomotive force of remaining four phases can be expressed as:

$$\begin{cases} f'_C = 0.5C_p \cdot NI_m\cos(p\theta - \alpha_2)\cos(\omega t - 120°) \\ f'_D = 0.5C_p \cdot NI_m\cos(p\theta - \beta_2)\cos(\omega t - 180°) \\ f'_E = 0.5C_p \cdot NI_m\cos(p\theta + \beta_2)\cos(\omega t + 120°) \\ f'_F = 0.5C_p \cdot NI_m\cos(p\theta + \alpha_2)\cos(\omega t + 60°) \end{cases} \quad (13)$$

a reconfigured four phase synthetic magnetomotive force $f'_{q\_ad2}$ can be expressed as:

$$f'_{q\_od2} = f'_C + f'_D + f'_E + f'_F = 0.25C_p \cdot NI_m \quad (14)$$

$$\underbrace{\cos(p\theta - \omega t + 30°) \cdot [2\cos(90° - \alpha_2) + 2\cos(150° - \beta_2) + 1]}_{Forward} +$$

$$\underbrace{0.25C_p \cdot NI_m\cos(p\theta + \omega t - 30°) \cdot [2\cos(90° + \alpha^2) + 2\cos(150° + \beta_2 + 1]}_{Reverse}.$$

after calculation, when $\alpha_2$ is 60° and $\beta_2$ is 180°, the maximum forward fundamental magnetomotive force can be achieved and the reverse fundamental magnetomotive force is zero, thus realizing a low-vibration reconfiguration of the magnetomotive force for the adjacent two-phase open-phase fault;

if the phase A and D open circuit are chosen to represent a non-adjacent two-phase open-phase fault, since the remaining four phase windings are symmetrically distributed with phase B and F and phase C and phase E, assume that the phase angles of phase B and F are $-\alpha_3$ and $\alpha_3$ respectively, and the phase angles of phase C and E are $-\beta_3$ and $\beta_3$, respectively, then a reconfigured fundamental magnetomotive force of the remaining four phases can be expressed as:

$$\begin{cases} f'_B = 0.5C_p \cdot NI_m\cos(p\theta - \alpha_3)\cos(\omega t - 60°) \\ f'_C = 0.5C_p \cdot NI_m\cos(p\theta - \beta_3)\cos(\omega t - 120°) \\ f'_E = 0.5C_p \cdot NI_m\cos(p\theta + \beta_3)\cos(\omega t + 120°) \\ f'_F = 0.5C_p \cdot NI_m\cos(p\theta + \alpha_3)\cos(\omega t + 60°) \end{cases} \quad (15)$$

a reconfigured five phase synthetic magnetomotive force $f'_{q\_nonad2}$ can be expressed as:

$$f'_{q\_nonad2} = f'_B + f'_C + f'_D + f'_F = \underbrace{0.25C_p \cdot NI_m\cos(p\theta - \omega t) \cdot [2\cos(60° - \alpha_3) + 2\cos(120° - \beta_3)]}_{Forward} + \underbrace{0.25C_p \cdot NI_m\cos(p\theta + \omega t) \cdot [2\cos(60° + \alpha_3) + 2\cos(120° + \beta_3)]}_{Reverse}. \quad (16)$$

after calculation, when $\alpha_3$ is 30° and $\beta_3$ is 150°, the maximum forward fundamental magnetomotive force can be achieved and the reverse fundamental magnetomotive force is zero, thus realizing a low-vibration reconfiguration of the magnetomotive force for the non-adjacent two-phase open-phase fault;

if the phase A, B and D open circuit are chosen to represent a three-phase open-phase fault, for remaining three-phase windings, assuming that phase C and F are symmetrically distributed with respect to phase E, and the phase angles of phase C and F are $-\alpha_4$ and $\alpha_4$, respectively, and the phase angle of phase E is 150°, then a reconfigured fundamental magnetomotive force of the remaining three phase windings can be expressed as:

$$\begin{cases} f'_C = 0.5C_p \cdot NI_m\cos(p\theta - \alpha_4)\cos(\omega t - 120°) \\ f'_E = 0.5C_p \cdot NI_m\cos(p\theta - 150°)\cos(\omega t - 150°) \\ f'_F = 0.5C_p \cdot NI_m\cos(p\theta + \alpha_4)\cos(\omega t + 60°) \end{cases} \quad (17)$$

a reconfigured five phase synthetic magnetomotive force $f'_{q3}$ can be expressed as:

$$f'_{q3} = f'_C + f'_E + f'_F = \underbrace{0.25C_p \cdot NI_m(p\theta - \omega t + 30°) \cdot [2\cos(90° - \alpha_4) + 1]}_{Forward} + \underbrace{0.25C_p \cdot NI_m\cos(p\theta + \omega t - 30°) \cdot [2\cos(90° + \alpha_4) + 1]}_{Reverse}. \quad (18)$$

after calculation, when $\alpha_4$ is 30°, the maximum forward fundamental magnetomotive force can be achieved and the reverse fundamental magnetomotive force is zero, thus realizing a low-vibration reconfiguration of the magnetomotive force for the three-phase open-phase fault.

9. The low-vibration fault-tolerant current algorithm for the open-phase faults of the six-phase permanent magnet motors according to claim 1, in step 4, the specific process is as follows:

once a reconfigured current phase angle is solved, the expression of low-vibration fault-tolerant current can be obtained for four typical open-phase operating conditions; if a phase A open circuit is chosen to represent one-phase open-phase fault, the function of low-vibration fault-tolerant current for remaining five phase windings is expressed as:

$$\begin{cases} I'_B = 1.03I_m\cos(\omega t - 45°) \\ I'_C = 1.03I_m\cos(\omega t - 135°) \\ I'_D = 1.03I_m\cos(\omega t - 180°) \\ I'_E = 1.03I_m\cos(\omega t + 135°) \\ I'_F = 1.03I_m\cos(\omega t + 45°) \end{cases} \quad (19)$$

wherein $I_m$ represents a current amplitude, $\omega$ represents an electrical angular velocity; and $I'_B$, $I'_C$, $I'_D$, $I'_E$ and $I'_F$ represent the functions of the low vibration fault-tolerant current of phases B, C, D, E, and F, respectively;

if the phase A and B open circuit are chosen to represent an adjacent two-phase open-phase fault, a reconfigured four phase low vibration fault-tolerant current can be expressed as:

$$\begin{cases} I'_C = 1.16I_m\cos(\omega t - 60°) \\ I'_D = 1.16I_m\cos(\omega t - 180°) \\ I'_E = 1.16I_m\cos(\omega t + 180°) \\ I'_F = 1.16I_m\cos(\omega t + 60°) \end{cases} \quad (20)$$

if the phase A and D open circuit are chosen to represent a non-adjacent two-phase open-phase fault, the reconfigured four phase low vibration fault-tolerant current can be expressed as:

$$\begin{cases} I'_B = 1.16I_m\cos(a)t - 30°) \\ I'_C = 1.16I_m\cos(a)t - 150°) \\ I'_E = 1.16I_m\cos(a)t + 150°) \\ I'_F = 1.16I_m\cos(a)t + 30°) \end{cases} \quad (21)$$

if the phase A, B and D open circuit are chosen to represent a three-phase open-phase fault, a reconfigured three phase low vibration fault-tolerant current can be expressed as:

$$\begin{cases} I'_C = 1.5I_m\cos(\omega t - 30°) \\ I'_E = 1.5I_m\cos(\omega t - 150°) \\ I'_F = 1.5I_m\cos(\omega t + 30°) \end{cases} \quad (22)$$

10. The low-vibration fault-tolerant current algorithm for the open-phase faults of the six-phase permanent magnet motors according to claim 1, in step 5, the specific process is as follows:

the previously calculated low-vibration fault-tolerant current expression is used as an excitation for a stator winding, and the radial force distribution is numerically calculated using a finite element simulation software; a difference in radial force distribution operating under a low-vibration fault-tolerant condition and operation under an open-phase fault condition is compared to verify an improvement effect of a radial force; and furthermore, a simulation of a vibration acceleration response under the low-vibration fault-tolerant condition is conducted to validate the improvement effect of the vibration acceleration response.

* * * * *